US012346310B2

United States Patent
Dang et al.

(10) Patent No.: US 12,346,310 B2
(45) Date of Patent: Jul. 1, 2025

(54) SUPPORTING DATABASE TRANSACTIONS IN A DISTRIBUTED COMPUTING ENVIRONMENT

(71) Applicant: Dell Products L.P., Round Rock, TX (US)

(72) Inventors: Duc The Dang, San Jose, CA (US); Brian Nguyen, San Jose, CA (US); Rashi Dubey, Toronto (CA); David Kit Nam Lam, Daly City, CA (US); Rohit Basu, Brentwood, CA (US); Phuong Thao Trung Le, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/330,031

(22) Filed: Jun. 6, 2023

(65) Prior Publication Data

US 2024/0411748 A1  Dec. 12, 2024

(51) Int. Cl.
*G06F 9/00* (2018.01)
*G06F 16/23* (2019.01)

(52) U.S. Cl.
CPC .................. *G06F 16/2379* (2019.01)

(58) Field of Classification Search
CPC .................................. G06F 16/2379
USPC ...................................... 707/703
See application file for complete search history.

(56) References Cited

U.S. PATENT DOCUMENTS 11,789,922 B1 * 10/2023 Jain .................. G06F 9/466
   707/703
11,934,370 B1 *  3/2024 Nguyen ............. G06F 16/24
2020/0250747 A1 *  8/2020 Padmanabhan ...... G06Q 20/065

FOREIGN PATENT DOCUMENTS

WO  WO-2024118056 A1 *  6/2024

* cited by examiner

*Primary Examiner* — Tuankhanh D Phan
(74) *Attorney, Agent, or Firm* — Staniford Tomita LLP

(57) ABSTRACT

An access service is positioned between a set of container groups and a SQL database service. Upon receipt, at the access service, of a REST request from any container group indicating that a SQL transaction should be started, an entry is created in a staging database, separate from the SQL database service, to track the SQL transaction. Multiple connections are allowed to be established from the container groups to the access service over which other REST requests from any container group are sent. The other REST requests include details of SQL operations to be performed as part of the SQL transaction. The details are cached in the staging database. Upon receiving a REST request from any container group indicating that the SQL transaction should be committed, a single connection is established between the access service and SQL database service to commit the transaction, including the details, as an atomic transaction.

18 Claims, 9 Drawing Sheets

SUPPORTING DATABASE TRANSACTIONS IN A DISTRIBUTED COMPUTING ENVIRONMENT

TECHNICAL FIELD

The present invention relates generally to information processing systems, and more particularly to facilitating atomic database transactions in a distributed computing environment.

BACKGROUND

An atomic database transaction refers to a set of one or more database operations such as inserting, updating, or deleting data in a database in which all the operations within the transaction are successfully completed or none of them are. Atomicity helps to ensure data integrity and maintain the consistency of the database.

A distributed computing system is a system whose components are located on different networked computers. One of the challenges of a distributed computing system is maintaining concurrency. In particular, ensuring atomicity in a distributed computing system is difficult because requests for operations, processes, and so forth may be distributed across any number of components. There is a need to handle atomic database transactions in a distributed computing system environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

An access service is positioned between a set of container groups and a SQL database service. Upon receipt, at the access service, of a REST request from any container group indicating that a SQL transaction should be started, an entry is created in a staging database, separate from the SQL database service, to track the SQL transaction. Multiple connections are allowed to be established from the container groups to the access service over which other REST requests from any container group are sent. The other REST requests include details of SQL operations to be performed as part of the SQL transaction. The details are cached in the staging database. Upon receiving a REST request from any container group indicating that the SQL transaction should be committed, a single connection is established between the access service and SQL database service to commit the transaction, including the details, as an atomic transaction.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
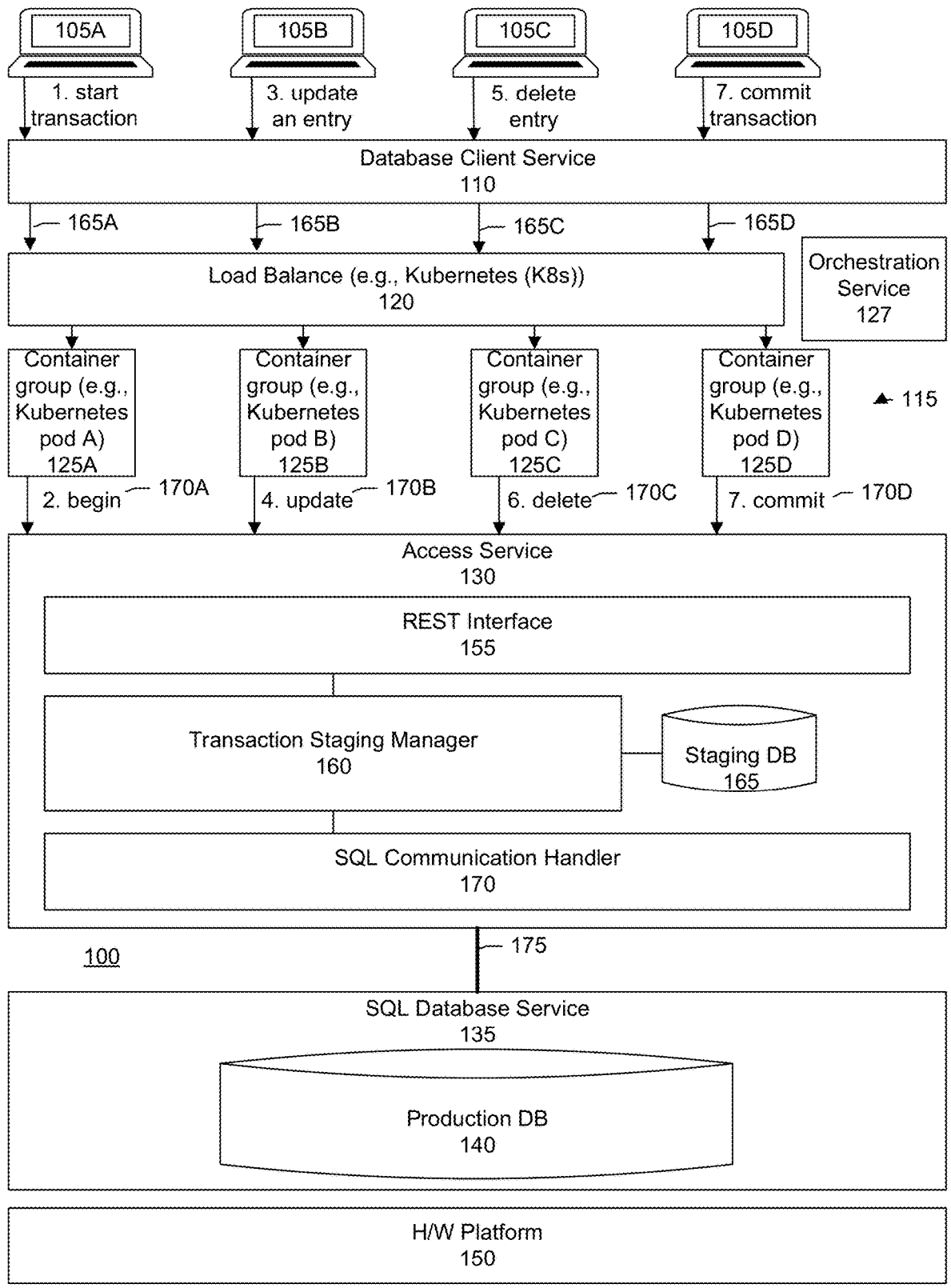
FIG. 1 shows a block diagram of an information processing system for supporting SQL database transactions via a REST interface in a containerized computing environment, according to at least one embodiment.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a block diagram of an information processing system 100 for facilitating structured query language (SQL) database transactions in a containerized computing environment. In an embodiment, the computing environment includes a Docker containerization platform as developed by Docker, Inc. and a Kubernetes container orchestration platform as provided by the Cloud Native Computing Foundations. A SQL database is a type of relational database that stores and manages data in a structured manner. Examples of SQL databases include MySQL, Oracle, Microsoft SQL Server, and PostgreSQL. Users or client applications use SQL queries or operations to access and make changes to the data. Some examples of SQL operations include SELECT, INSERT, UPDATE, and DELETE.

A SELECT operation retrieves data from one or more tables. For example, <SELECT*FROM employees WHERE department='sales'> selects all the data from the "employees" table where the department column equals 'sales.' An INSERT operation adds new data to a table. For example, <INSERT INTO customers (name, email, phone) VALUES ('John Doe', 'johndoe@example.com', '555-1234')> inserts a new row into the "customers" table with the specified name, email, and phone values. An UPDATE operation modifies existing data in a table. For example, <UPDATE orders SET status='shipped' WHERE order_id=123> updates the "status" column of the "orders" table to "shipped" where the "order_id" is 123. A DELETE operation removes data from a table. For example, <DELETE FROM products WHERE product_id=456> deletes the row from the "products" table where the "product_id" is 456.

An atomic transaction refers to a group of operations where every operation in the group must succeed or the effects of all of them must be undone, i.e., rolled back. For example, bank transfers are carried out as an atomic set of two operations: a debit from one account and a credit to another account. The debit and credit is implemented as an atomic group. A file lock is acquired at a start of a transaction to ensure that no other transaction can modify the same data while the transaction is in progress. Once the transaction completes, the lock is released thereby allowing other transactions to access the data. If a transaction fails for any reason, all changes made to the database within that transaction are rolled back to maintain data consistency. Examples of transaction processing systems within which atomic transactions are desirable include banking applications, credit card processing applications, reservation and booking systems, and many others.

In at least one embodiment, when a client application initiates a transaction, it creates a connection to the database or, more particularly, database service and starts sending requests over the connection to perform the necessary database operations. The database service uses the connection to track the progress of the transaction to ensure that all of the requested operations are executed atomically. If an error occurs during the transaction, the database service uses the connection to roll back the transaction, undoing all of the changes made so far. In other words, the connection provides a context within which the database service manages the operations that should be handled as an atomic set.

A distributed computing environment, such as a containerized computing environment, however, includes a load balancer that spreads requests across multiple compute instances. Each compute instance may create its own connection to the database or database service. The presence of multiple connections results in the database service being unable to group and track the multiple operations associated with the multiple connections that should be handled as part of a single atomic transaction. In at least one embodiment, an access service to the database service is provided to ensure that requests for SQL operations that should be carried out as an atomic set are, in fact, carried out as an atomic set despite the requests being spread across multiple compute instances and connections.

A feature of modern application development is a microservices architecture. The microservices architecture involves breaking down large, monolithic applications into smaller, independent services referred to as microservices. These independent services or microservices can be developed, deployed, and managed independently. Each microservice performs a specific business function and communicates with other microservices through application programming interfaces (APIs).

Containers provide a way to package and run these microservices in an isolated environment. A container is a virtualized computing environment that runs an application program as a service (e.g., microservice). Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Containerized applications are typically managed by a container orchestration service. The container orchestration service can restart containers that fail, replace containers, kill containers that fail to respond to health checks, withhold advertising them to clients until they are ready to serve, scale the number of containers up or down to rapidly adjust to changes in demand, and load balance the demand across multiple instances of a microservice for efficiently handling.

An example of a container orchestration service is Kubernetes. Kubernetes is an open-source container-orchestration system for automating computer application deployment, scaling, and management. Containers may be grouped into logical units referred to as pods. A node, such as a node of a cluster, may include multiple pods. Pods may be distributed across nodes of a Kubernetes computing environment. There can be multiple instances of a pod. A node includes an operating system, e.g., Linux, that supports the containers of the pod. In at least one embodiment, a pod includes a group of one or more containers that share the same network namespace and can communicate with each other using localhost. In other words, when multiple containers are deployed in the same pod, they share the same network namespace and can communicate with each other using "localhost" as the destination address. In at least one embodiment, containers in the same pod can communicate with each other using the same Internet Protocol (IP) address and port number as if they were communicating on the same machine. In at least one embodiment, each pod may be assigned a unique IP address that allows the pods to communicate with each other. Pods are designed to be ephemeral and disposable. In other words, pods, e.g., container groups, can be created, destroyed, or replaced at any time without affecting the overall application. Thus, if a pod (or the node it executes on) fails, the container orchestration service, e.g., Kubernetes, can automatically create a new instance of that pod or container group to continue operations.

FIG. 1 shows a layer diagram including a set of client input devices 105A-D communicating with a database client service layer 110 to access an enterprise data system 115. The enterprise data system includes a load balancing layer 120, a set of deployed compute instance units arranged into groupings of containers 125A-D, a container orchestration service 127 managing the load balancing and container groupings, an access service 130, and a data layer having a SQL database service 135 that is responsible for a production database 140. In an embodiment, the production database may be referred to as a database registry, target database, or final database. The access service may be referred to as a REST access service. In at least one embodiment, the groups of containers correspond to Kubernetes pods.

The container orchestration service provides for the administration, scaling, and management of a containerized application deployed on or across the container groupings (e.g., Kubernetes pods). As discussed, a pod may include a group of one or more containers, each container hosting an instance of a microservice associated with the application (e.g., banking application, reservations and booking application, or other). There can be any number of container groupings or pods.

The enterprise data system is supported by an underlying hardware layer 150. The hardware layer may include storage including storage arrays and any number of hosts, nodes, or clusters of nodes, each node or host having hardware such as memory, processors, network interface cards (NIC), and other hardware components to run the services of the enterprise data system such as the access service and SQL database service.

As shown in the example of FIG. 1, requests to access the enterprise data system are received by the load balancing layer and redirected to different container groups or pods for handling. Load balancing distributes network traffic across multiple instances of the containerized application to improve its availability and performance. Some examples of load balancing algorithms that may be used by the load balancing layer include round-robin, least connections, IP hash, random, and others.

The access service is positioned between the set of container groups or Kubernetes pods and the SQL database service. The access service may be referred to as a REpresentational State Transfer (REST) SQL access service. The access service includes a REST interface 155, a transaction staging manager 160 that is responsible for managing a staging database 165, and a SQL communication handler 170. In at least one embodiment, the staging database may be referred to as a transactions database or temporary database.

The REST interface provides for REST API communications between the set of container groups or Kubernetes pods and access service. In other words, the container groups or pods communicate with the access service using REST APIs, rather than via a database library. The REST API uses Hypertext Transfer Protocol (HTTP) methods, such as GET, POST, PUT, and DELETE, to perform CRUD (Create, Read, Update, Delete) operations on resources. Each resource is identified by a unique URL (Uniform Resource Locator) and can be accessed using the appropriate HTTP method. HTTP is a client-server protocol, where the client (e.g., Kubernetes pod) sends a request to the server (e.g., access service), which responds with the requested data. The request and response are in the form of messages that contain headers and, in some cases, a message body.

The transaction staging manager of the access service is responsible for the temporary storage of a SQL transaction, including all SQL details or SQL operations associated with the transaction, in the staging database. As discussed, due to the load balancing provided by the container orchestration service (e.g., Kubernetes), SQL details or SQL operations associated with a transaction may be spread across multiple, e.g., two or more, container groups or Kubernetes pods. A container group or Kubernetes pod, in turn, makes a REST request to the access service. The REST request may include details of a SQL operation for a particular transaction. A different container group or Kubernetes pod may make another REST request to the access service. The other REST request may include other details for another SQL operation that are also associated with the particular transaction. The particular transaction including the details of the SQL operations are cached in the staging database.

The SQL communication handler is responsible for handling communications between the access service and SQL database service. For example, when a transaction is to be committed to the production database, the SQL communication handler of the access service establishes a connection with the SQL database service to commit the transaction, including all SQL operations associated with the transaction, as a single set of atomic operations.

More particularly, when the particular transaction is to be committed, the transaction staging manager collects and groups the details of the SQL operations associated with the transaction from the staging database and flushes the transaction, including all the associated SQL details, from the staging database to the SQL database service via the connection established between access service and SQL database service. The transaction and associated SQL details are committed using a single connection from the access service to the SQL database service. This allows the SQL database service to track the transaction and associated SQL details using the single connection, thereby helping to ensure that all of the requested operations are executed atomically.

In at least one embodiment, on a software appliance, SQL databases are used to keep system data for other processes on the system. These processes may use the native SQL client SDKs (Software Development Kits) for the corresponding programing languages. This design and implementation tightly couples the client processes and SQL database.

A trend in software development includes moving to the microservice architecture, which is propelled by Docker and Kubernetes environments, especially on Kubernetes.

When moving from a stand-alone software appliance to the microservice architecture on Kubernetes or other containerized deployment, each process is converted into a service on Kubernetes. Meanwhile, using a SQL database to keep system information, such as performance, telemetry data and so on, is still popular in the Kubernetes environment. Consequently, there is a need for other services to access the SQL database service to manage their own data.

Figure 2:
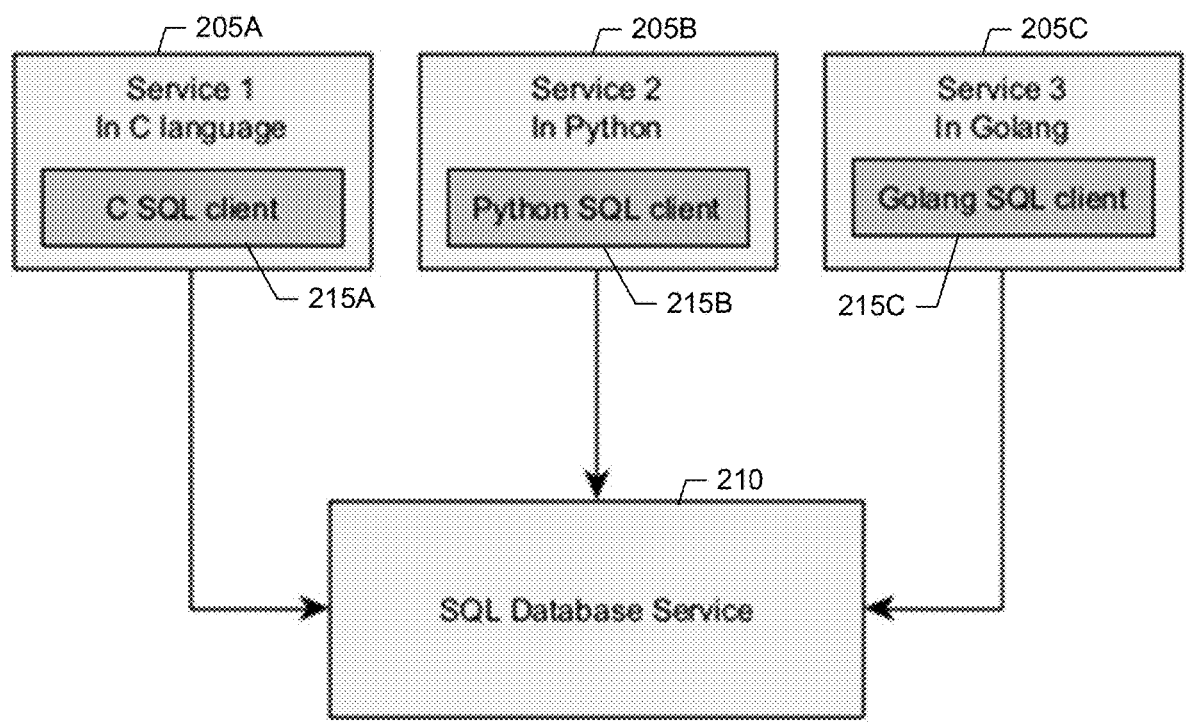
FIG. 2 shows a block diagram of clients using database libraries to access a database service, according to at least one embodiment.

There can be different approaches for accessing a SQL database on Kubernetes. FIG. 2 shows an example of an approach where each service has its own SQL native client SDK. As shown in the example of FIG. 2, each of different services 205A-C accessing a SQL database service 210 has its own SQL native client SDK (Software Developer Kit) 215A-C, respectively, to access the database. Each service can utilize all database functionalities including atomic SQL transactions. Changing backend database type requires all services to change their own SQL native client SDK.

Advantages of the approach shown in FIG. 2 includes the ability to directly talk to the backend database using SQL drivers, which support the database transaction functionality and the lack of a separate REST SQL access service in the middle. Disadvantages include a requirement for a native SQL library for each supported programming language. This impractical to scale and extremely hard to maintain and support. Another disadvantage includes a requirement for a new set of libraries to use a new backend database. It is impractical to change the backend database to a new better one since it takes too much time and effort to provide each native SQL library for each supported language.

Figure 3:
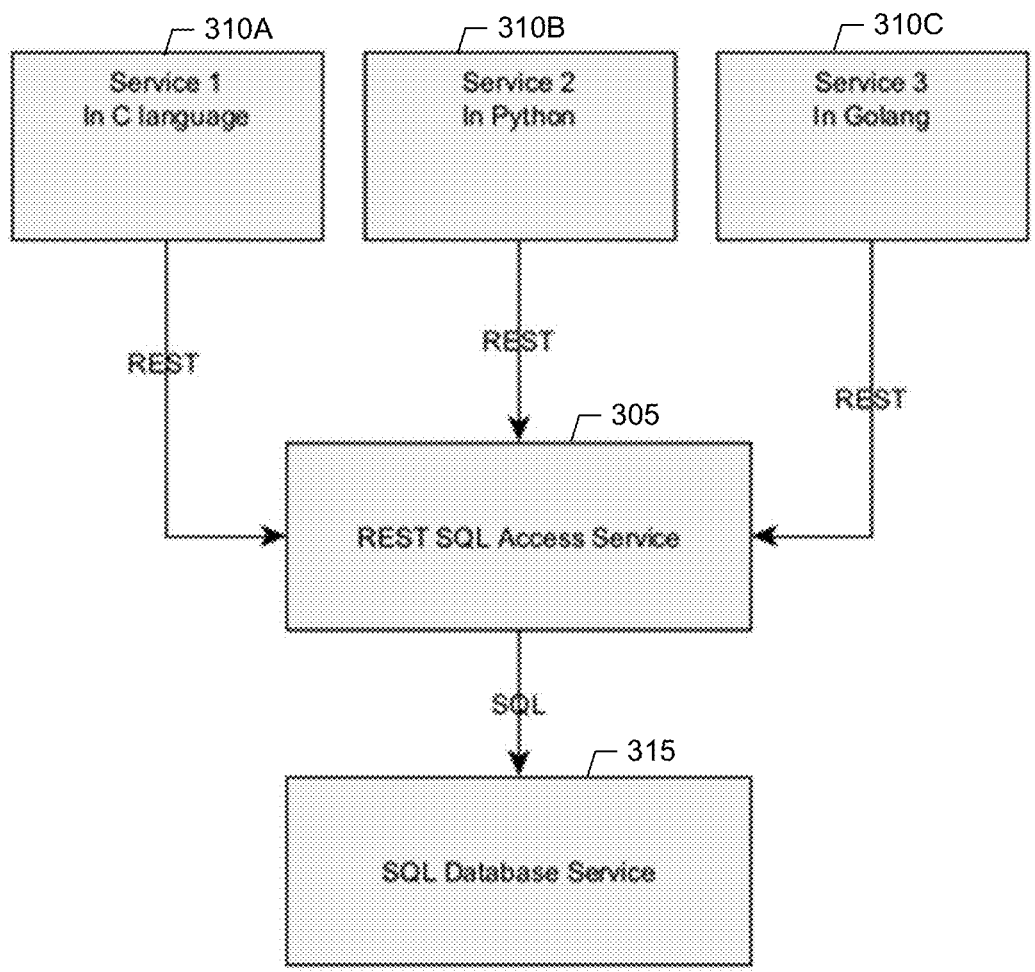
FIG. 3 shows a block diagram of an access service for a database service, according to at least one embodiment.

FIG. 3 shows an example of a microservice approach. In this approach, a REST SQL access service 305 is introduced between SQL client services 310A-C and a SQL database service 315. The REST SQL access service provides a REST API interface, which is the primary service to service communication protocol, for SQL client services to access the SQL database service backend without knowledge on the SQL database. Only the REST SQL access service has direct access to the SQL database service using the native SQL SDK. Services written in any language can access the SQL database using a REST API through REST SQL access service. Only the REST SQL access service needs to know how to access SQL database natively.

Advantages of the approach shown in FIG. 3 include clients being able to use the HTTP (Hypertext Transfer Protocol) protocol through REST interfaces to send requests to REST SQL access service to access the backend database. To use a new database backend, only the communication module between the REST SQL access service and backend database is changed. The client interfaces to REST SQL Access service remain unchanged. Client code can be easily generated from the OpenAPI specification file for any programing language. This design fits into microservice architecture, which is becoming increasingly popular at the present. Disadvantages include a requirement for the REST SQL access service to implement a transaction service to support atomic operation through REST. This effort is only one time. The REST transaction mechanism can be reused as is for another SQL database. There might be some drops in the performance since there is an extra hop between clients and backend database.

In at least one embodiment, systems and techniques provide for a central service that provides SQL database access. The central service provides the microservice common REST APIs (Application Program Interfaces) to access the SQL database backend. The central service further allows other services to use the REST APIs to save and manage their configuration data without knowledge on the backend database type and product.

The REST architecture is stateless. The REST architecture does not provide atomic SQL transaction operations, which requires a transaction to be done through one database connection. On Kubernetes or other containerized platform, a transaction can span on multiple pods of REST SQL access service because of Kubernetes' load balance mechanism.

Figure 4:
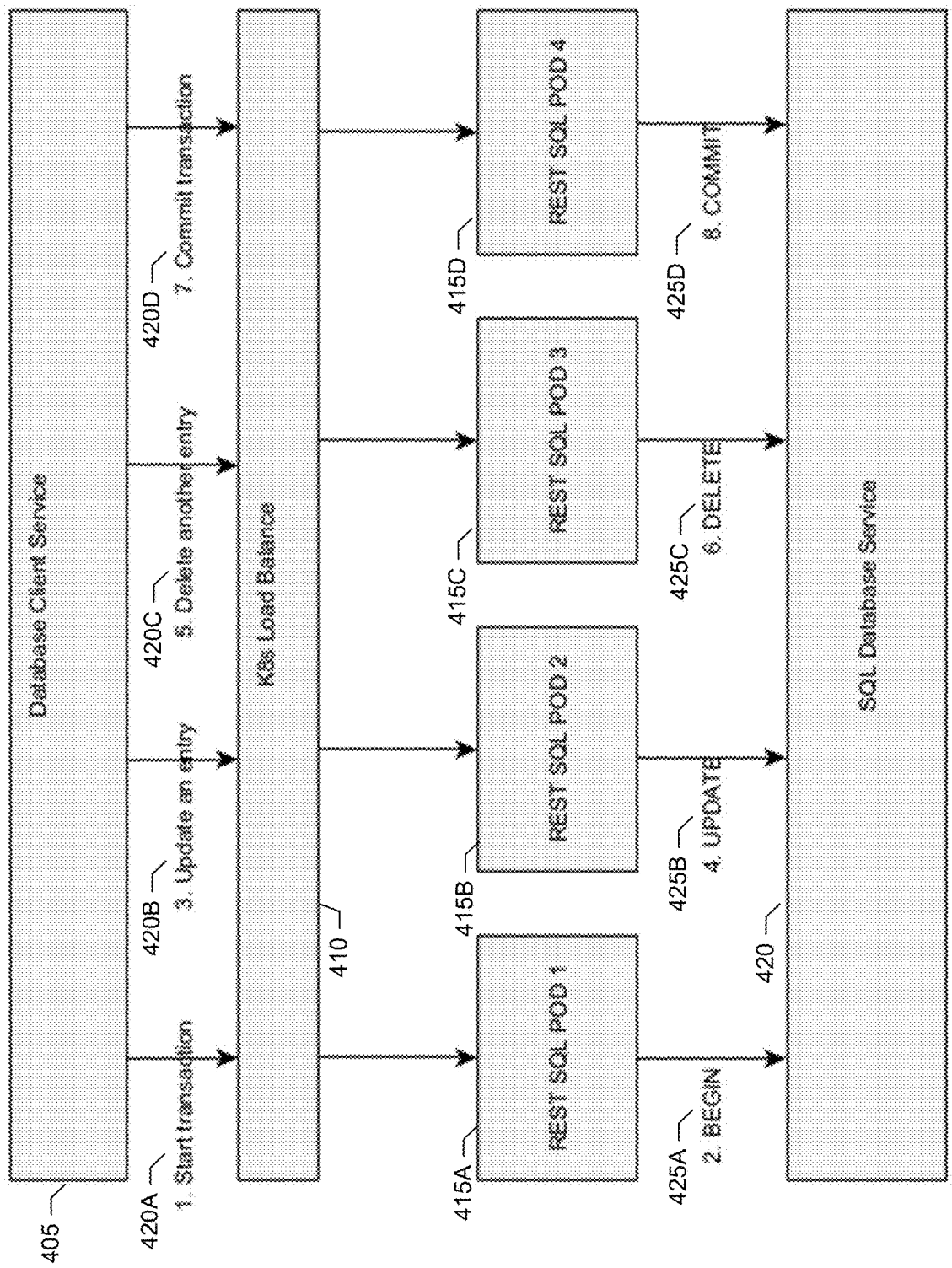
FIG. 4 shows a block diagram of a load balancer distributing network traffic, according to at least one embodiment.

As a matter fact, as shown in the example of FIG. 4, transaction operations can span on multiple REST SQL access pods or container groups through multiple SQL database connections. In the example of FIG. 4, there is a database client service layer 405, a Kubernetes load balancing layer 410, a set of Kubernetes pods 415A-D, and a SQL database service layer 420. As discussed, load balancing involves distributing workload across the pods. For example, in a step 420A, the load balancing layer receives a first request from the database client service to start a transaction. The load balancing layer forwards the first request to a first pod 415A. In a step 425A, the first pod opens a first connection to the SQL database service for the first request.

In a step 420B, the load balancing layer receives a second request from the database client service to update an entry. The load balancing layer forwards the second request to a second pod 415B. In a step 425B, the second pod opens a second connection to the SQL database service for the second request.

In a step 420C, the load balancing layer receives a third request from the database client service to delete another entry. The load balancing layer forwards the third request to a third pod 415C. In a step 425C, the third pod opens a third connection to the SQL database service for the third request.

In a step 420D, the load balancing layer receives a fourth request from the database client service to commit the transaction. The load balancing layer forwards the fourth request to a fourth pod 415D. In a step 425D, the fourth pod opens a fourth connection to the SQL database service for the fourth request.

Consider, as an example, that each of the four requests are to be grouped into an atomic set. Since multiple connections, however, have been made with the SQL database service, the SQL database service is not able to track the process of each request and is thus unable to enforce atomicity.

To handle this REST transaction issue in Kubernetes, the system shown in FIG. 1 includes a mechanism and algorithm that guarantees the REST SQL access service can provide an atomic transaction for a SQL transaction. In particular, as shown in the example of FIG. 1, access service 130 is positioned between the container groups or pods and SQL database service. The access service receives from the container groups or pods the multiple requests over multiple connections.

For example, in a step 165A, the load balancing layer receives a first request from the database client service to start a transaction. The load balancing layer forwards the first request to a first pod 125A. In a step 170A, the first pod sends the request as a first REST request to the access service over a first connection. The access service, rather than immediately opening a connection to the SQL database service, however, caches the first request into the staging database.

In a step 165B, the load balancing layer receives a second request from the database client service to update an entry. The load balancing layer forwards the second request to a second pod 125B. In a step 170B, the second pod sends the request as a second REST request to the access service over a second connection. Again, the access service caches the second request into the staging database.

In a step 165C, the load balancing layer receives a third request from the database client service to delete another entry. The load balancing layer forwards the third request to a third pod 125C. In a step 170C, the third pod sends the request as a third REST request to the access service over a third connection. Again, the access service caches the third request into the staging database.

In a step 165D, the load balancing layer receives a fourth request from the database client service to commit the transaction. The load balancing layer forwards the fourth request to a fourth pod 125D. In a step 170D, the fourth pod sends the request as a fourth REST request to the access service over a fourth connection. Again, the access service caches the fourth request into the staging database. However, since the fourth request indicates that the transaction should be committed, the access service now establishes a single connection 175 from the access service to the SQL database service over which the transaction, including all the SQL operation details (e.g., update entry and delete entry) cached in the staging database, are flushed to the SQL database service. The SQL database service, having received the transaction, including all the SQL details, over a single connection is now able to track a progress of each SQL operation via the single connection in order to guarantee atomicity.

In at least one embodiment, the design and mechanism of the REST SQL transaction provides an atomic SQL transaction through a REST API and addresses the technical problem of a REST SQL transaction on a Kubernetes environment.

Figure 5:
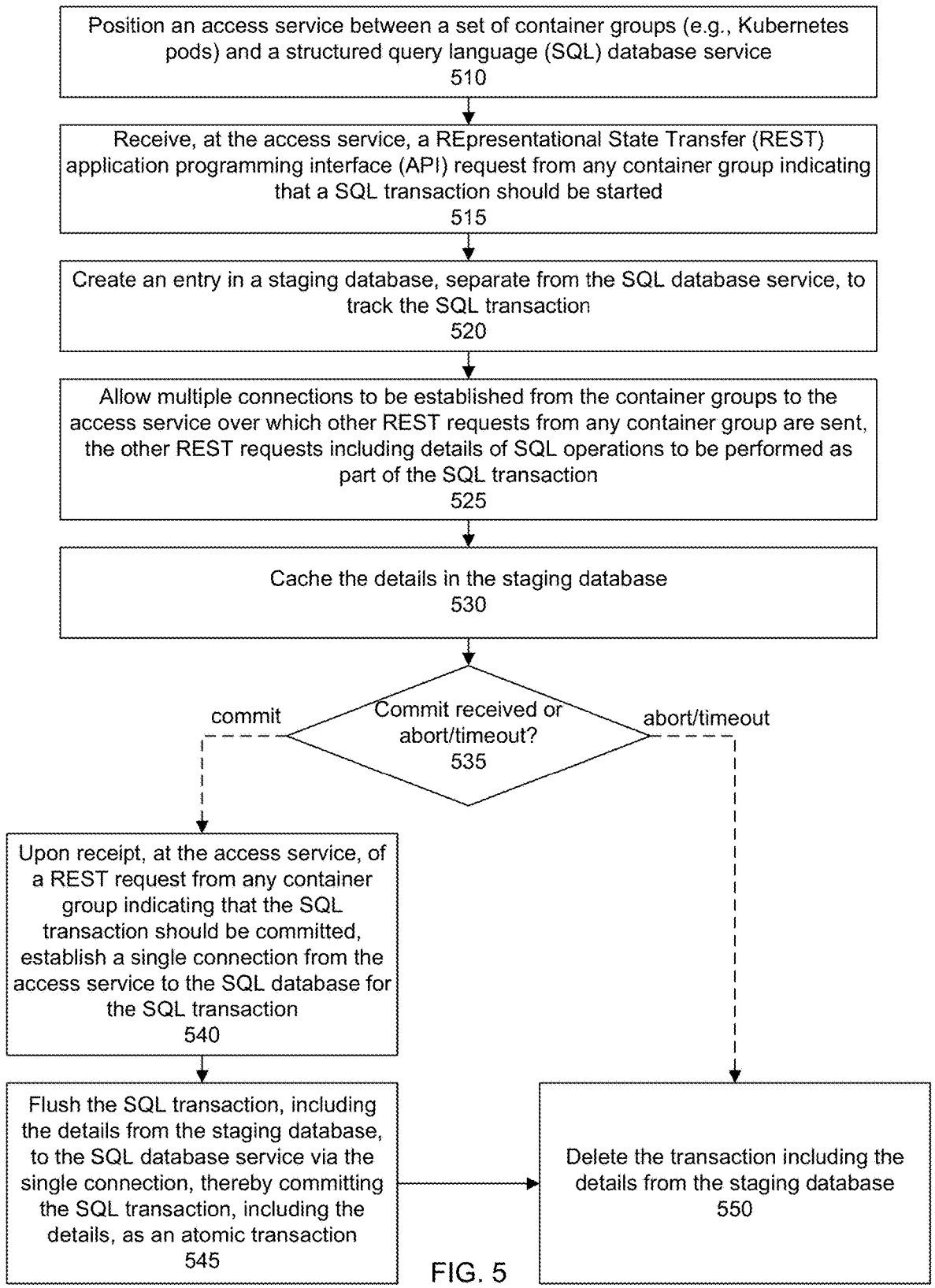
FIG. 5 shows an overall flow for supporting SQL database transactions via a REST interface in a containerized computing environment, according to at least one embodiment.

FIG. 5 shows an overall flow for supporting a SQL database transaction via a REST interface in a Kubernetes or other containerized environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, an access service is positioned between a set of container groups (e.g., Kubernetes pods) and a structured query language (SQL) database service. The access service includes a REpresentational State Transfer (REST) application programming interface (API) for communicating with the container groups or pods and a SQL communication interface or handler for communicating with the SQL database service.

In a step 515, the access service receives, from any container group, a REST request indicating that a SQL transaction should be started. In a step 520, the access service creates a transaction identifier (ID) including an entry in a staging database to track the SQL transaction. The staging database is separate or different from the SQL database service. For example, the staging database may include a different schema, tables, and so forth. The access service returns the transaction ID to the requesting container group or pod. This allows the requesting container group or pod to distribute the transaction ID to other container groups, pods, clients, or entities for use in communicating with the access service about related SQL operations.

In a step 525, multiple connections are allowed to be established from the container groups to the access service over which other REST requests from any of the container groups are sent. These other REST requests include the transaction ID and details of SQL operations to be performed as part of the SQL transaction identified by the transaction ID.

In a step 530, the SQL operation details are cached in the staging database maintained by the access service. The access service tracks the SQL operations using the transaction ID so that all SQL operations can be mapped or grouped together despite the SQL operations being requested by different pods. Rather than immediately making a connection to the SQL database service, the opening of a connection to the SQL database service is delayed and the SQL operation details are held (temporarily) in the staging database.

In an embodiment, the transaction ID is a globally unique value across client, container groups or pods, and nodes per a Kubernetes or containerized system. In at least one embodiment, when a pod (or container group) receives a transaction start request, the pod creates, records the transaction ID to the staging transaction tables, then returns the transaction ID to the client through the connection that client opens.

Consider, as an example, a transaction ID having a value T1. In at least one embodiment, once a client has the transaction ID, e.g., T1, the client is in the control of how to use this transaction ID. The client can send back a subsequent request with transaction ID T1 itself, the client can forward the transaction ID T1 to other one or more other services to continue the task, or both. This is the business logic of the client side. The REST SQL access service does not need to necessarily track who sends the subsequent request with transaction ID T1. Instead, the REST SQL access service searches the request header information for the transaction ID. Thus, if or when the access service receives another request with a transaction ID T1 in the header, the access service can determine that this request belongs the transaction T1.

For the next subsequent request, the client, which can be another (Kubernetes) service, is configured to put the transaction ID. T1 in the HTTP header to specify to the access service that this request belongs transaction T1. This request may be sent from another container group or pod of the client service.

Upon receiving the subsequent request, a pod or container group of the REST SQL access service will look at the transaction ID in the header and find that this request belongs to the active transaction ID T1, so this REST SQL service pod or container group will save the request data to the staging transaction tables to the transaction T1 record set. This step can repeat as long as the client continues to send update requests with the transaction T1 in the HTTP header.

When a pod or container group of the REST SQL access service receives the commit request with T1 in the header, the pod or container group will acquire a lock, which can be SQL exclusive lock, to prevent to access to this T1 record set in the staging transaction tables of this transaction T1. Then this pod or container group will read the data of T1 and commit the whole transaction to actual target database table and release the lock.

Figure 6:
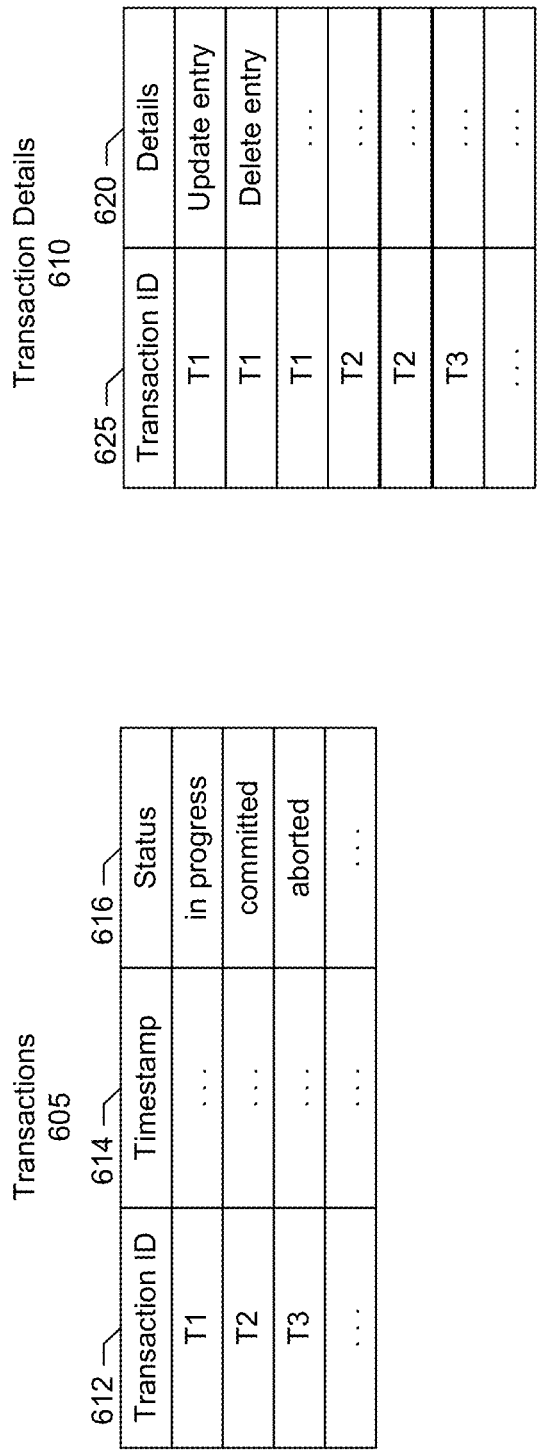
FIG. 6 shows an example of tables for a staging database, according to at least one embodiment.

FIG. 6 shows an example of tables from the staging database. In an embodiment, the staging database includes a first table 605 and a second table 610. The first table stores, for each transaction, a transaction identifier (ID) 612 generated by the access service, timestamp 614 indicating when the transaction was requested, and a status 616C indicating a progress of the transaction.

The second table stores SQL operation details 620 for each transaction. For example, a transaction may include first and second SQL operations. The first SQL operation may request an update to an entry in the production database maintained by the SQL database service. The second SQL operation may request a deletion of another entry in the production database maintained by the SQL database service. Details of the first SQL operation may be stored in a first record of the second table. Details of the second SQL operation may be stored in a second record of the second table. The first and second SQL operations may be issued by different (or the same) container groups or Kubernetes pods. For example, the first SQL operation may be issued by a first container group or Kubernetes pod. The second SQL operation may be issued by a second container group or Kubernetes pod, different from the first Kubernetes pod. A foreign key 625 in the second table tracks the transaction IDs to allow the SQL operation details to be mapped back to the transactions stored in the first table.

Having two tables for the staging database facilitates normalizing the staging database. Normalizing a database involves organizing the data into tables and defining relationships among the tables in order to reduce data redundancy and improve data integrity. As one of skill in the art would recognize, however, there can be other database structures or implementations to achieve the same or similar results. For example, in another embodiment, there can be a single table. In another embodiment, rather than having one or more fixed tables a table may be created dynamically for each transaction.

Referring back now to FIG. 5, in a step 535, a determination is made as to whether a request to commit the transaction has been received or whether a timeout has been reached.

In a step 540, upon receipt, at the access service, of a REST request from any container group (e.g., Kubernetes pod) indicating that the SQL transaction should be committed, a single connection is established from the access service to the SQL database service for the SQL transaction.

In a step 545, the SQL transaction, including the details of SQL operations cached in the staging database, are collected and flushed from the staging database to the SQL database service via the single connection, thereby committing the SQL transaction, including the details, as an atomic transaction.

In a step 550, the SQL transaction, including the details, are deleted from the staging database. The staging database thus does not require a very large footprint since the data is expected to be stored for a relatively brief period of time (e.g., 5, 10, or 15 seconds). Thus, a size of the staging database may be less than a size of the SQL database.

As shown in the example of FIG. 5, the SQL transaction is also deleted from the staging database if a request to abort is received or a timeout is reached. For example, the access service may be configured with a particular timeout value, e.g., 10 seconds. A timer is started upon receipt of a REST request to start a transaction. When a period of time as specified by the timeout value lapses or expires without there being any activity or other requests associated with the transaction being received, the information associated with the transaction may be cleared from the staging database.

Figure 7:
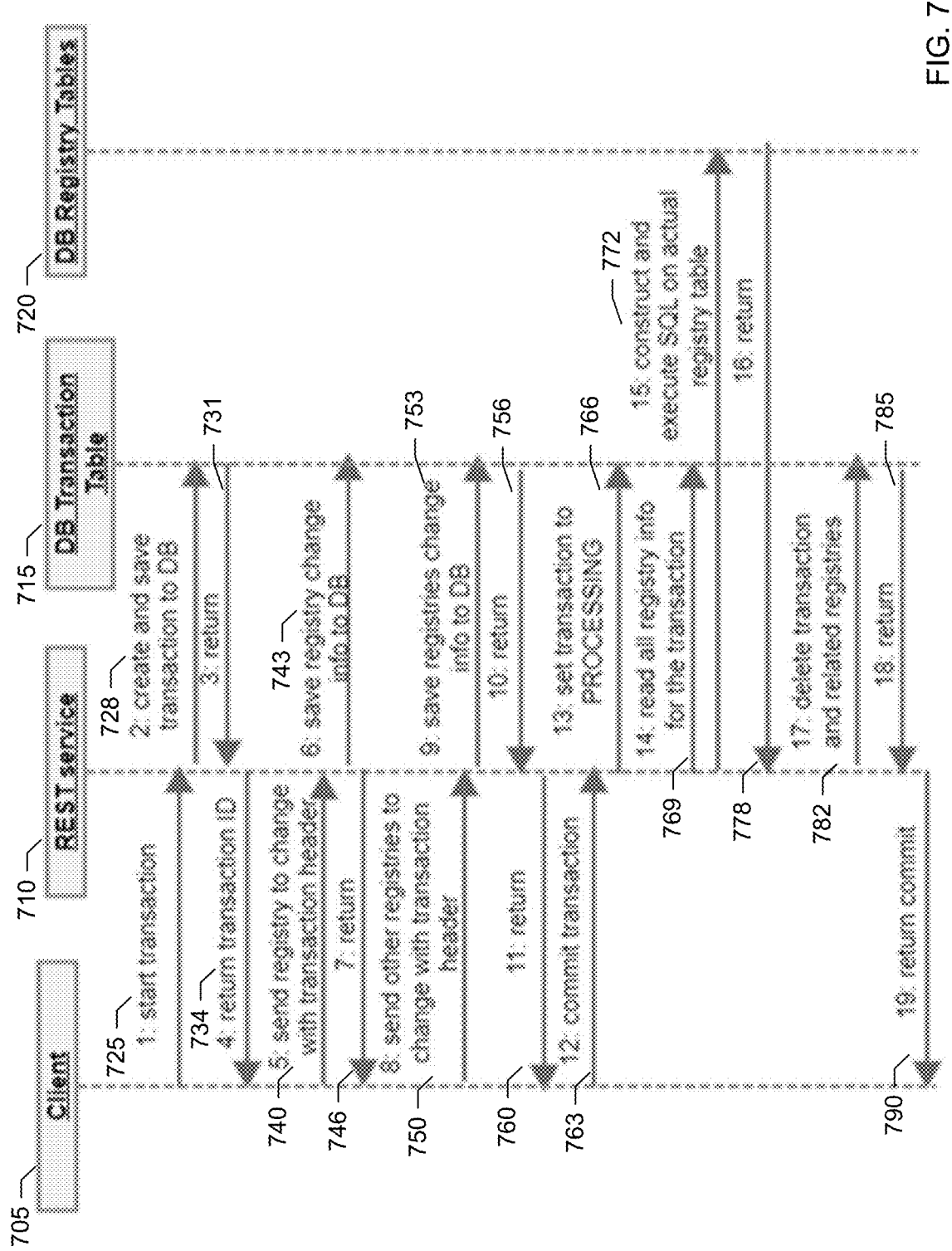
FIG. 7 shows a sequence diagram to execute changes to a database with a REST transaction, according to at least one embodiment.

FIG. 7 shows an example of a sequence diagram for supporting a SQL database transaction via a REST interface in a Kubernetes or other containerized environment, according to at least one embodiment. The sequence diagram shows a flow to execute a registry (e.g., production database) modification with a REST transaction. In this example, the entities include a client (e.g., Kubernetes pods or container groups) 705, REST access service 710, a database transaction table (e.g., staging database) 715, and database registry tables (e.g., production database) 720.

In a step 1 725, the client makes a REST request to the REST service to start a transaction. In a step 2 728, the REST service creates and saves the transaction in the database transaction table. In a step 3 731, the database transaction table returns a response to the REST service indicating that the transaction has been successfully created. In a step 4 734, the REST service returns to the client a transaction ID. This allows the client or Kubernetes pod or container group to distribute the transaction ID to each of the other Kubernetes pods, container groups, clients, or other services that may be involved with the transaction.

In a step 5 740, the client sends to the REST service changes to be made to the registry database with transaction header. In a step 6 743, the REST service saves the registry change information to the transaction database. In a step 7 746, the REST service returns an indication of success to the client. In a step 8 750, the client sends to the REST service other changes to be made to the registry database with transaction header. In a step 9 753, the REST service saves the registry change information to the transaction database. In a step 10 756, the transaction database returns a response to the REST service indicating that the changes have been successfully saved. In a step 11 760, the REST service returns an indication of success to the client regarding the changes having been successfully received.

In a step 12 763, the client sends to the REST service a request to commit the transaction. In a step 13 766, a status of the transaction is set to processing. In a step 14 769, the REST service reads all the registry information for the transaction from the transaction table. In a step 15 772, the REST service constructs and executes a SQL transaction on the actual registry table. In other words, the REST service constructs and executes a SQL transaction (e.g., BEGIN, UPDATE, ABORT) on the actual registry data table. In an embodiment, only one pod or container group, which receives the commit request, performs this step to guarantee the SQL transaction is atomically committed through one connection. Various REST APIs are provided to send data modification requests for steps 5 and 8 in the sequence shown in FIG. 7.

In a step 16 778, the database registry returns an indication of success to the REST service. In a step 17 782, the REST service deletes the transaction and related registries information from the transaction database. In a step 18 785, the transaction database returns an indication of successful deletion to the REST service. In a step 19 790, the REST service returns to the client an indication that the commit was successful.

Transaction tables can be temporary tables to improve parallelism across tables. In an embodiment, there is a file lock mechanism per namespace. The file lock mechanism per namespace can be provided to guarantee the atomic transaction across services and threads. The pod that receives the commit transaction will 1) acquire the file lock between steps 12 and 13; and 2) release the file lock between steps 18 and 19.

Thus, in at least one embodiment, to handle a transaction spanning multiple pods or container groups and connections and provide an atomic REST transaction service, two transaction tables are provided to keep all transaction related requests until the transaction is committed. The server only performs the actual database transaction when receiving the corresponding commit request. The transaction is deleted and removed if the client sends the abort request. In this case, there is no actual database transaction to change registries in the registry table (e.g., production database). REST SQL service pods keep transaction related operations in separated transaction tables until a commit or abort request is received. The transaction is removed either: 1) After the server processes the commit or abort and returns the transaction result to the client; or 2) Idle timeout is reached. In at least one embodiment, the idle timeout is 10 seconds.

Table A below shows an example of the main REST APIs for the transaction algorithm.

TABLE A

Create transaction—this returns a transaction ID
POST/api/v1/registries/transactions
Commit a transaction—transaction ID provided in the URI parameter
POST/api/v1/registries/transactions/{id}/commit
Abort a transaction—transaction ID provided in the URI parameter
POST/api/v1/registries/transactions/{id}/abort
Modify database entries associating with a specific transaction in the HTTP header
PATCH/api/v1/registries
Get database entries. Note: POST is used to not expose database table information through the URI (Uniform Resource Identifier) query part
POST/api/v1/registries A custom HTTP Header X-REG-TRANSACTION may be introduced to pass the transaction ID between client and server for a specific transaction.

Table B below shows further details of the transaction REST API according to one or more embodiments.

TABLE B

Create Transaction
POST/api/v1/registries/transactions
Request:
  Registry TransactionCreate
    namespace: string of registry namespace—required
Response:
  RegistryTransactionInstance:
    id: string—transaction ID
    namespace: string—registry namespace
    creation_epoch: unsigned 64-bit integer
Commit Transaction
POST/api/v1/registries/transactions/{id}/commit
  id: transaction ID from the response of the above create API
Abort Transaction
POST/api/v1/registries/transactions/{id}/abort
  id: transaction ID from the response of the above create API
Transaction Structure
Transaction
  id: string
  namespace: string
  creation_epoch: unsigned 64-bit integer
  registries: list of registries to update or delete
    key: string
    value: string (optional)
    operation: SET, REMOVE As discussed, the Kubernetes load balancer can send client requests to one of the pods to process the client requests. Meanwhile, to complete a SQL transaction, a client sends a sequence of requests as follows: 1) Starts transaction. 2) Sends one or multiple registry requests (e.g., production database operation requests), where the request contains transaction id and registries info to modify. 3) Commits transaction.

The above requests can be handled by multiple registry pods or container groups. As a result, the transaction information is persisted in the database. When a registry pod receives the corresponding commit transaction, the REST server on this pod reads the transaction information from the transaction table and constructs a key-value (KV) store call or Postgres SQL to send request to the backend database (e.g., production database) in one atomic operation.

Table C below shows an example of the transaction table.

TABLE C

| Column | Type | Comment |
| --- | --- | --- |
| id | string | unique transaction id |
| namespace | string | registry namespace |
| creation_epoch | 64-bit integer | creation epoch |
| status | integer | 1: pending, 2: processing (either commit or abort) |

Table D below shows an example of the transaction information or details table.

TABLE D

| Column | Type | Comment |
| --- | --- | --- |
| transaction | string | transaction id from the transaction table |
| key | string | |
| value | string | |
| operation | integer | 1: SET or UPDATE, 2: REMOVE |

Table E below shows examples of the registry REST APIs.

TABLE E

Registry Models
RegistryInstance:
  key: string
  value: string
RegistryInstances: An array of RegistryInstance elements
RegistryModifyEntry
  key: string (required)
  value: string (optional)
  operation: enumeration of SET, DELETE
RegistryModify: an array of RegistryModifyEntry
Get Registries
Since registry keys can contain some sensitive information, POST is used to get registry so that the additional request information can be specified in the request payload instead of in the query part of the URI
In the below request input:
1. If the key is not specified, then all registries of all namespaces are returned.
2. If the specified key is not found, then an error is returned.
3. If the key is specified and is_prefix is not specified or specified as FALSE, then only one key and value is returned.
4. If is_prefix is TRUE, then all registries whose keys start with the value of key are returned.
POST/api/v1/registries
Request: RegistryGet
key: string (optional)
is_prefix: Boolean (optional)—If TRUE, return all registries whose keys start with the value of specified "key" above TABLE E-continued Response
   200: Registry Instances
   4xx-5xx: ErrorMessage
Set or Delete registries
Since registry clients can perform registry set and delete in one transaction, the following REST
This API is designed to support both use cases:
a. In an independent request (an atomic SQL commit).
b. As a part of the REST transaction.
PATCH/api/v1/registries
Request: RegistryModify
Response:
   204 (No Content): success with empty response
   4xx-5xx: ErrorMessage In at least one embodiment, a method includes: positioning an access service between a plurality of container groups and a structured query language (SQL) database service; receiving, at the access service, a REpresentational State Transfer (REST) application programing interface (API) request from any container group indicating that a SQL transaction should be started; creating an entry in a staging database, separate from the SQL database service, to track the SQL transaction; allowing multiple connections to be established from the plurality of container groups to the access service over which other REST requests from any container group are sent, the other REST requests comprising details of SQL operations to be performed as part of the SQL transaction; caching the details in the staging database; receiving, at the access service, a REST request from any container group indicating that the SQL transaction should be committed; establishing a single connection from the access service to the SQL database service; flushing the SQL transaction including the details from the staging database to the SQL database service via the single connection, thereby committing the SQL transaction including the details an atomic transaction; and after the SQL transaction including the details have been committed via the single connection to the SQL database service, deleting the transaction including the details from the staging database.

In at least one embodiment, a method includes: positioning an access service between a plurality of container groups and a structured query language (SQL) database service; receiving, at the access service, a REpresentational State Transfer (REST) application programing interface (API) request from any container group indicating that a SQL transaction should be started; creating an entry in a staging database, separate from the SQL database service, to track the SQL transaction; allowing multiple connections to be established from the plurality of container groups to the access service over which other REST requests from any container group are sent, the other REST requests comprising details of SQL operations to be performed as part of the SQL transaction; caching the details in the staging database; receiving, at the access service, a REST request from any container group indicating that the SQL transaction should be committed; and establishing a single connection from the access service to the SQL database service to commit the SQL transaction including the details as an atomic transaction via the single connection.

The method may include after the SQL transaction including the details have been committed via the single connection to the SQL database service, deleting the transaction including the details from the staging database.

In an embodiment, a load balancer load balances the SQL operations to be performed as part of the SQL transaction over the plurality of container groups.

The method may include upon receiving the REST request indicating that the SQL transaction should be committed, acquiring a lock on a database of the SQL service to prevent other SQL transactions from modifying data associated the SQL transaction while the SQL transaction is in progress The method may include upon receiving the REST request indicating that the SQL transaction should be started, generating and returning to a container group an identifier for the SQL transaction; caching the identifier for the SQL transaction in a first table associated with the staging database; and upon receiving the details of the SQL operations to be performed as part of the SQL transaction, caching the details in a second table associated with the staging database.

The method may include after establishing the single connection from the access service to the SQL database service, flushing the SQL transaction including the details of the SQL operations from the staging database to the SQL database service via the single connection. In at least one embodiment, the container groups are Kubernetes pods.

In at least one embodiment, there is a system comprising: a processor; and memory configured to store one or more sequences of instructions which, when executed by the processor, cause the processor to carry out the steps of: positioning an access service between a plurality of container groups and a structured query language (SQL) database service; receiving, at the access service, a REpresentational State Transfer (REST) application programing interface (API) request from any container group indicating that a SQL transaction should be started; creating an entry in a staging database, separate from the SQL database service, to track the SQL transaction; allowing multiple connections to be established from the plurality of container groups to the access service over which other REST requests from any container group are sent, the other REST requests comprising details of SQL operations to be performed as part of the SQL transaction; caching the details in the staging database; receiving, at the access service, a REST request from any container group indicating that the SQL transaction should be committed; and establishing a single connection from the access service to the SQL database service to commit the SQL transaction including the details as an atomic transaction via the single connection.

In at least one embodiment, there is a computer program product, comprising a non-transitory computer-readable medium having a computer-readable program code embodied therein, the computer-readable program code adapted to be executed by one or more processors to implement a method comprising: positioning an access service between a plurality of container groups and a structured query language (SQL) database service; receiving, at the access service, a REpresentational State Transfer (REST) application programing interface (API) request from any container group indicating that a SQL transaction should be started; creating an entry in a staging database, separate from the SQL database service, to track the SQL transaction; allowing multiple connections to be established from the plurality of container groups to the access service over which other REST requests from any container group are sent, the other REST requests comprising details of SQL operations to be performed as part of the SQL transaction; caching the details in the staging database; receiving, at the access service, a REST request from any container group indicating that the SQL transaction should be committed; and establishing a single connection from the access service to the SQL database service to commit the SQL transaction including the details as an atomic transaction via the single connection.

Figure 8:
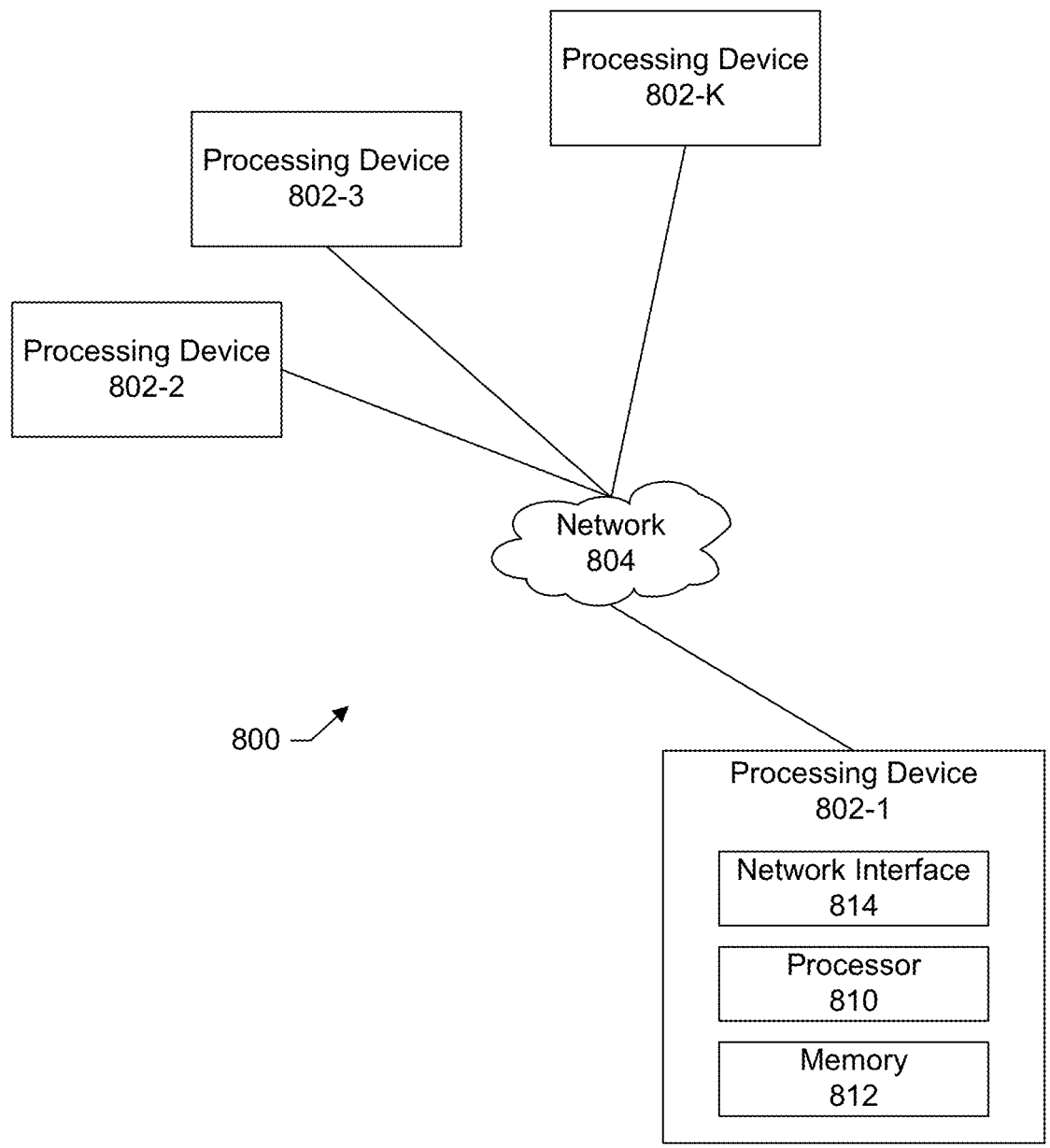
FIG. 8 shows a block diagram of a processing platform that may be utilized to implement at least a portion of an information processing system, according at least one embodiment.

FIG. 8 shows an example of a processing platform 800 that may include at least a portion of the information handling system shown in FIG. 1. The example shown in FIG. 8 includes a plurality of processing devices, denoted 802-1, 802-2, 802-3 . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 9:
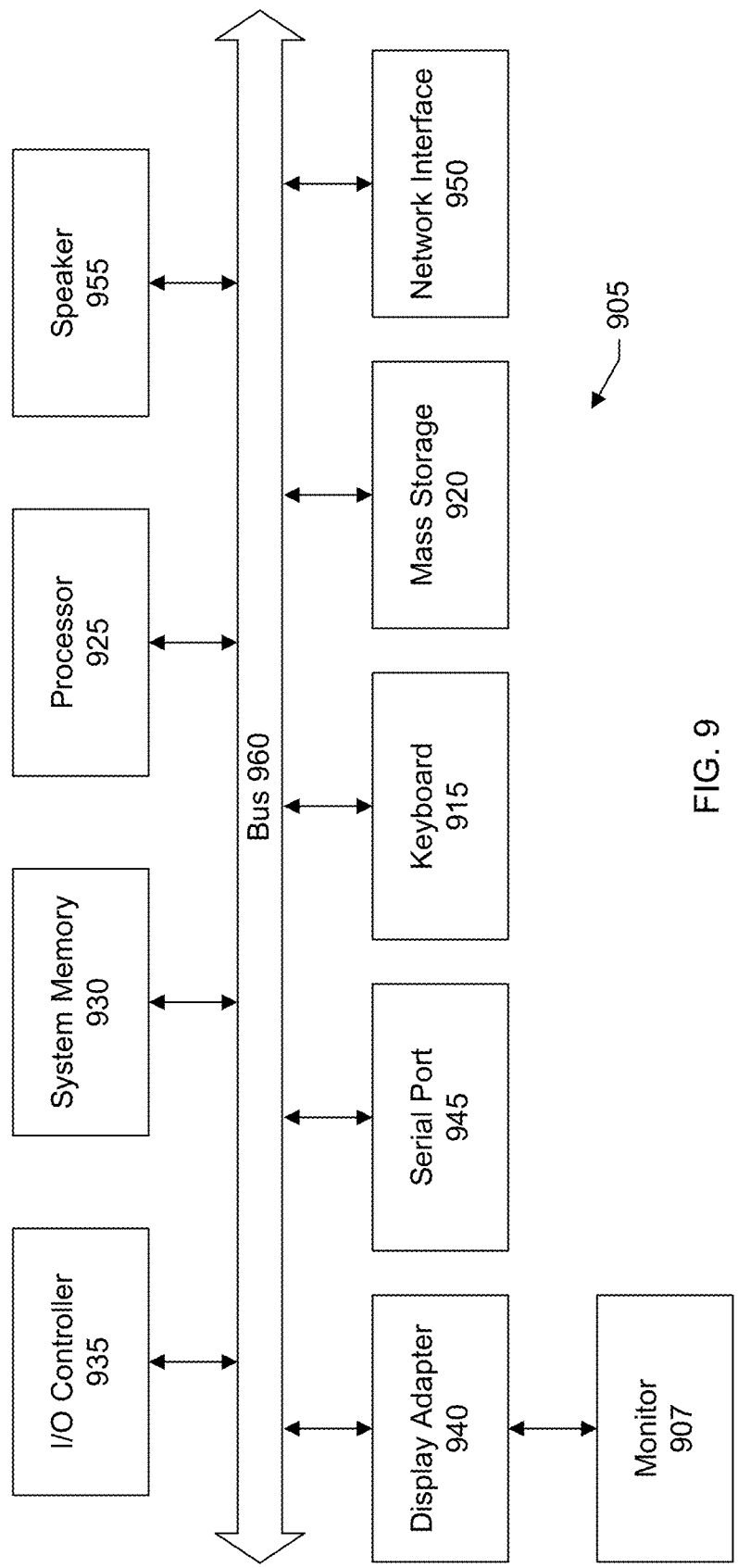
FIG. 9 shows a block diagram of a computer system suitable for use with the system, according to at least one embodiment.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11c, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   positioning an access service between a plurality of Kubernetes pods and a structured query language (SQL) database service, the plurality of Kubernetes pods hosting instances of microservices from a containerized application and positioned to receive requests from a load balancer that distributes the requests across the Kubernetes pods, and
   the access service comprising a staging database, separate from the SQL database service, that temporarily holds SQL operations that are requested by different Kubernetes pods over different connections, but are to be atomically committed;
   receiving, at the access service, a REpresentational State Transfer (REST) application programing interface (API) request from any Kubernetes pod indicating that a SQL transaction should be started;
   creating an entry in the staging database to track the SQL transaction;
   allowing multiple connections to be established from the plurality of Kubernetes pods to the access service over which other REST requests from any of the Kubernetes pods are sent, the other REST requests comprising details of SQL operations to be performed as part of the SQL transaction;
   caching the details in the staging database;
   receiving, at the access service, a REST request from any Kubernetes pod indicating that the SQL transaction should be committed; and
   establishing a single connection from the access service to the SQL database service to commit the SQL transaction including the details as an atomic transaction via the single connection.

2. The method of claim 1 further comprising:
   after the SQL transaction including the details have been committed via the single connection to the SQL database service, deleting the transaction including the details from the staging database.

3. The method of claim 1 wherein a load balancer load balances the SQL operations to be performed as part of the SQL transaction over the plurality of Kubernetes pods.

4. The method of claim 1 further comprising:
   upon receiving the REST request indicating that the SQL transaction should be committed, acquiring a lock on a database of the SQL service to prevent other SQL transactions from modifying data associated the SQL transaction while the SQL transaction is in progress.

5. The method of claim 1 further comprising:
   upon receiving the REST request indicating that the SQL transaction should be started, generating and returning to a Kubernetes pod an identifier for the SQL transaction;
   caching the identifier for the SQL transaction in a first table associated with the staging database; and
   upon receiving the details of the SQL operations to be performed as part of the SQL transaction, caching the details in a second table associated with the staging database.

6. The method of claim 1 further comprising:
   after establishing the single connection from the access service to the SQL database service, flushing the SQL transaction including the details of the SQL operations from the staging database to the SQL database service via the single connection.

7. A system comprising: a processor; and memory configured to store one or more sequences of instructions which, when executed by the processor, cause the processor to carry out the steps of:
   positioning an access service between a plurality of Kubernetes pods and a structured query language (SQL) database service, the plurality of Kubernetes pods hosting instances of microservices from a containerized application and positioned to receive requests from a load balancer that distributes the requests across the Kubernetes pods, and
   the access service comprising a staging database, separate from the SQL database service, that temporarily holds SQL operations that are requested by different Kubernetes pods over different connections, but are to be atomically committed;
   receiving, at the access service, a REpresentational State Transfer (REST) application programing interface (API) request from any Kubernetes pod indicating that a SQL transaction should be started;
   creating an entry in the staging database to track the SQL transaction;
   allowing multiple connections to be established from the plurality of Kubernetes pods to the access service over which other REST requests from any of the Kubernetes pods are sent, the other REST requests comprising details of SQL operations to be performed as part of the SQL transaction;
   caching the details in the staging database;
   receiving, at the access service, a REST request from any Kubernetes pod indicating that the SQL transaction should be committed; and
   establishing a single connection from the access service to the SQL database service to commit the SQL transaction including the details as an atomic transaction via the single connection.

8. The system of claim 7 wherein the processor further carries out the steps of:
   after the SQL transaction including the details have been committed via the single connection to the SQL database service, deleting the transaction including the details from the staging database.

9. The system of claim 7 wherein a load balancer load balances the SQL operations to be performed as part of the SQL transaction over the plurality of Kubernetes pods.

10. The system of claim 7 wherein the processor further carries out the steps of:
upon receiving the REST request indicating that the SQL transaction should be committed, acquiring a lock on a database of the SQL service to prevent other SQL transactions from modifying data associated the SQL transaction while the SQL transaction is in progress.

11. The system of claim 7 wherein the processor further carries out the steps of:
upon receiving the REST request indicating that the SQL transaction should be started, generating and returning to a Kubernetes pod an identifier for the SQL transaction;
caching the identifier for the SQL transaction in a first table associated with the staging database; and
upon receiving the details of the SQL operations to be performed as part of the SQL transaction, caching the details in a second table associated with the staging database.

12. The system of claim 7 wherein the processor further carries out the steps of:
after establishing the single connection from the access service to the SQL database service, flushing the SQL transaction including the details of the SQL operations from the staging database to the SQL database service via the single connection.

13. A computer program product, comprising a non-transitory computer-readable medium having a computer-readable program code embodied therein, the computer-readable program code adapted to be executed by one or more processors to implement a method comprising:
positioning an access service between a plurality of Kubernetes pods and a structured query language (SQL) database service, the plurality of Kubernetes pods hosting instances of microservices from a containerized application and positioned to receive requests from a load balancer that distributes the requests across the Kubernetes pods, and
the access service comprising a staging database, separate from the SQL database service, that temporarily holds SQL operations that are requested by different Kubernetes pods over different connections, but are to be atomically committed;
receiving, at the access service, a REpresentational State Transfer (REST) application programing interface (API) request from any Kubernetes pod indicating that a SQL transaction should be started;
creating an entry in the staging database to track the SQL transaction;
allowing multiple connections to be established from the plurality of Kubernetes pods to the access service over which other REST requests from any of the Kubernetes pods are sent, the other REST requests comprising details of SQL operations to be performed as part of the SQL transaction;
caching the details in the staging database;
receiving, at the access service, a REST request from any Kubernetes pod indicating that the SQL transaction should be committed; and
establishing a single connection from the access service to the SQL database service to commit the SQL transaction including the details as an atomic transaction via the single connection.

14. The computer program product of claim 13 wherein the method further comprises:
after the SQL transaction including the details have been committed via the single connection to the SQL database service, deleting the transaction including the details from the staging database.

15. The computer program product of claim 13 wherein a load balancer load balances the SQL operations to be performed as part of the SQL transaction over the plurality of Kubernetes pods.

16. The computer program product of claim 13 wherein the method further comprises:
upon receiving the REST request indicating that the SQL transaction should be committed, acquiring a lock on a database of the SQL service to prevent other SQL transactions from modifying data associated the SQL transaction while the SQL transaction is in progress.

17. The computer program product of claim 13 wherein the method further comprises:
upon receiving the REST request indicating that the SQL transaction should be started, generating and returning to a Kubernetes pod an identifier for the SQL transaction;
caching the identifier for the SQL transaction in a first table associated with the staging database; and
upon receiving the details of the SQL operations to be performed as part of the SQL transaction, caching the details in a second table associated with the staging database.

18. The computer program product of claim 13 wherein the method further comprises:
after establishing the single connection from the access service to the SQL database service, flushing the SQL transaction including the details of the SQL operations from the staging database to the SQL database service via the single connection.

* * * * *